(12) United States Patent
Fujii

(10) Patent No.: US 8,928,611 B2
(45) Date of Patent: Jan. 6, 2015

(54) TOUCH SENSOR USABILITY ENHANCEMENT ON CLAMSHELL NOTEBOOK

(75) Inventor: Kazuo Fujii, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 109 days.

(21) Appl. No.: 13/593,871

(22) Filed: Aug. 24, 2012

(65) Prior Publication Data

US 2014/0055370 A1 Feb. 27, 2014

(51) Int. Cl.
*G06F 3/041* (2006.01)

(52) U.S. Cl.
USPC .......................................................... 345/173

(58) Field of Classification Search
CPC ............................. G06F 3/0213; G06F 3/0354
USPC ........................... 345/156, 173, 168; 715/702
See application file for complete search history.

(56) References Cited

U.S. PATENT DOCUMENTS

| | | | |
|---|---|---|---|
| 6,697,054 B1* | 2/2004 | Kamizono | 345/168 |
| 7,834,855 B2 | 11/2010 | Hotelling et al. | |
| 2007/0262968 A1* | 11/2007 | Ohshita et al. | 345/173 |
| 2010/0194680 A1* | 8/2010 | Miyamoto | 345/156 |
| 2011/0161809 A1* | 6/2011 | Gilmour | 715/702 |

OTHER PUBLICATIONS http://en.wikipedia.org/wiki/Windows_8, Aug. 19, 2012 at 18:43.

* cited by examiner

*Primary Examiner* — Andrew Sasinowski
(74) *Attorney, Agent, or Firm* — Shimokaji & Associates, P.C.

(57) ABSTRACT

An input device and computing system is provided for a user to input data. An input device may comprise a plurality of input keys, palm rest areas, and a touchpad. The palm rest areas may have a first palm rest area and a second palm rest area with each palm rest area includes a sensor configured to detect a body part of a user. A first sensor may be used for detecting a presence of a first body part of a user. A second sensor may be for detecting a presence of a second body part of a user, such as the left hand of the user. A touchpad may be disposed between the first sensor and the second sensor.

12 Claims, 2 Drawing Sheets

TOUCH SENSOR USABILITY ENHANCEMENT ON CLAMSHELL NOTEBOOK

BACKGROUND OF THE INVENTION

The present invention relates generally to methods and apparatus for data input and, more specifically, to proximity sensor or touch sensor usability enhancement on electronics, such as clamshell notebooks.

Proximity sensors (also commonly called touch pads or touch sensor devices) are widely used in a variety of electronic systems. Many electronic devices have a touch screen, which may be used in connection with a display to provide input information to the devices, for example, to perform selections among objects shown on the display. Such devices may comprise a keypad or keyboard for inputting information by the keys of the keyboard.

There exists a problem with usability in devices equipped both with a touch screen and a keyboard. When users try to touch the touch screen to perform some touch based action with fingers, they may simultaneously or accidentally press some key or keys in the keyboard. This may cause unintentional data input problem. The problem may be solved by keyboard lock operation. The keyboard may be activated and deactivated by manually pressing a certain key or a key combination of the keyboard. However, this method may be cumbersome because every time users want to use the keyboard, they have to manually activate and subsequently deactivate the key lock, to avoid erroneous key presses.

Therefore, it can be seen that there is a need for an automatic key lock.

SUMMARY

In one aspect, an input device comprises a plurality of input keys; palm rest areas adjacent to the plurality of input keys, wherein the palm rest areas have a first sensor for detecting a presence of a first body part of a user, and a second sensor for detecting a presence of a second body part of the user; and a touchpad disposed between the first sensor and the second sensor.

In another aspect, a method comprises steps of enabling a first sensor at a first palm rest area to detect a presence of a first body part of a user; enabling a second sensor at a second palm rest area to detect a presence of a second body part of the user; and enabling a keyboard so that the user can use the keyboard to input when the first sensor and the second sensor detect the presence of the first body part and the second body part respectively.

In a further aspect, a computer readable medium has computer usable program code embodied therewith. The computer program code may comprise computer program code configured to detect a presence of a first body part and a second body part of a user on palm rest areas of an electronic device; and computer program code configured to switch the keyboard between a keyboard disabled state and a keyboard enabled state, wherein in the keyboard disabled state at least a part of keyboard is disabled and wherein in the keyboard enabled state an input function of the keyboard is enabled; and computer program code configured to enable the keyboard when detecting a presence of the first body part and a second body part of the user on the palm rest areas of the electronic device.

These and other features, aspects and advantages of the present invention will become better understood with reference to the following drawings, description and claims.

DETAILED DESCRIPTION OF EMBODIMENTS

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments may comprise input devices, such as a touchpad and a keyboard, for example, which may be used for various models or designs of electronic devices, such as a notebook PC, a smart phone, a cell phone, and a personal digital assistant, for example. More specifically, exemplary embodiments provide sensors on palm rest areas to detect presence of a first body part and a second body part. Alternatively, exemplary embodiments may extend a touch pad sensing area to sense the presence of a first body part and a second body part.

Exemplary embodiments optimize the user-friendliness of communications devices from a tactile input perspective. Additional input points and options enable complex applications of functions otherwise impractical for computing devices. Exemplary embodiments provide an automatic keyboard lock when only one hand is on the palm rest area or both hands are absent on the palm rest areas so that users may put their hands on the keyboard and do not have to worry about accidentally pushing keyboard buttons.

Figure 1:
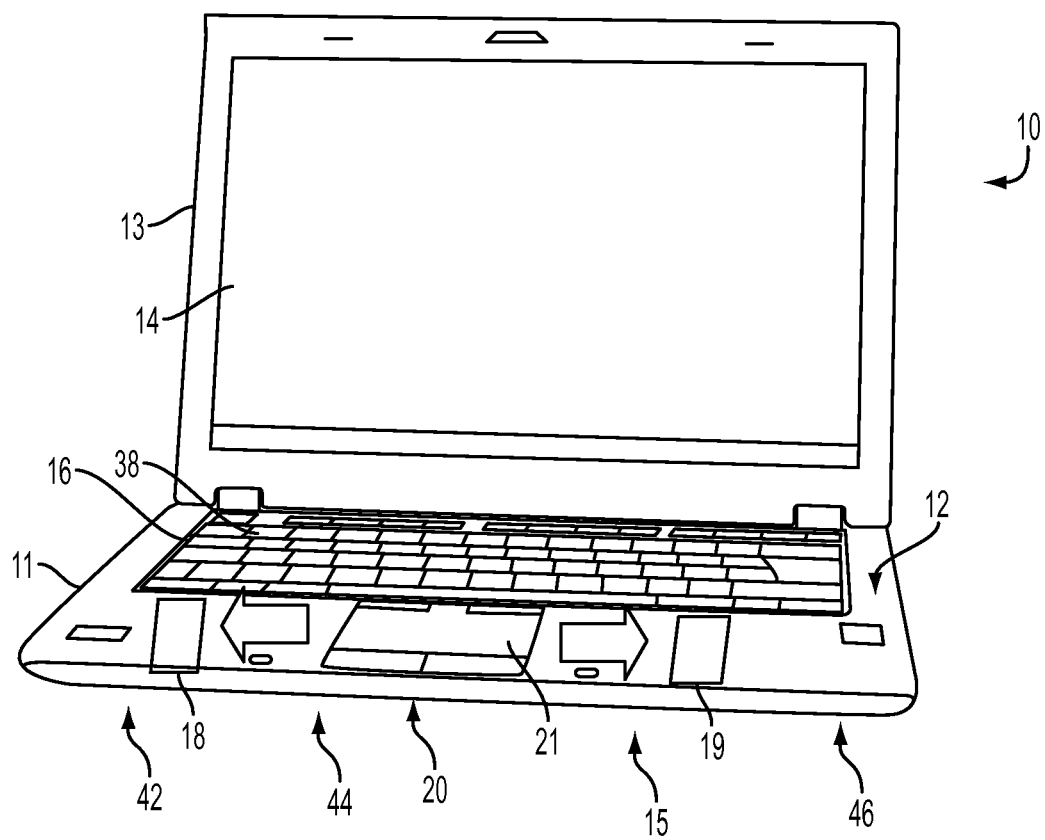
FIG. 1 is a perspective view of a notebook PC according to an exemplary embodiment in use.

The FIG. 1 is a perspective view of an exemplary embodiment of a computing system which is capable of receiving, processing, and outputting data, such as a notebook PC 10. The notebook PC 10 may be a laptop computer system, such as one of the ThinkPad® series of personal computers sold by Lenovo (US) Inc. of Morrisville, N.C., or a workstation computer, such as the ThinkStation®, which is sold by Lenovo (US) Inc. of Morrisville, N.C. The notebook PC 10 may have a display casing 13. A bottom case 11 may further accommodate system devices, such as a printed circuit board (PCB) (not shown). A keyboard 16 may be adapted for installation in the notebook PC 10. The bottom case 11 and the display casing 13 may be openably coupled to each other via hinge portions (not shown).

Still referring to the FIG. 1, the notebook PC 10 may further include an input device 12, which includes a plurality of input keys 38 on the keyboard 16, and palm rest areas 15 configured to support a body part of a user, such as a palm. The keyboard 16 may be electrically connected to the printed circuit board. The palm rest areas may include a first palm rest area 42 and a second palm rest area 46 with a central portion 44 separating the first palm rest area 42 and the right palm rest areas 46. The central portion may include a touchpad 20 or other cursor control devices. The first palm rest area 42 may have a first sensor 18 for detecting a presence of a body part of a user, such as a left hand of the user. The second palm rest area 46 may have a second sensor 19 for detecting a presence of another body part of the user, such as the right hand of the user. The touch pad 20 of the input device 12 may be disposed on the palm rest areas, such as between the first sensor 18 and the second sensor 19.

The palm rest areas 15 may include areas on a front, a top portion of the bottom case 11 and the keyboard unit 16 may be located behind the palm rest areas on the bottom case 11. Thus, in normal use by a user, the palm rest areas may be closer to the user than the keyboard, which is normally adjacent to the hinge portions which couple the bottom case to the display casing 13.

Still in the FIG. 1, the first sensor 18 may comprise a proximity sensor. The second sensor 19 may include a proximity sensor. The proximity sensor may be a sensor designed to detect the presence of nearby objects without any physical contact. The proximity sensor may emit an electromagnetic field or a beam of electromagnetic radiation (infrared, for instance), and may look for changes in the field or return signal.

When an object on the touching surface of the touchpad 20 is moved, a touch sensor 21 on the touchpad 20 may generate a touching signal. In one exemplary embodiment, the touch sensor 21 may be a single capacitive sensor. The touchpad 20 may be capacitive, resistive, or electromagnetic touchpads. For example, touchpad 20 may be a capacitive touchpad, which may include typically a two-dimensional grid of intersecting conductive traces in the X and Y directions. When a finger or another object contacts the touchpad, the circuitry, which may be disposed on the printed circuit board (PCB), may respond to the touch sensor 21 and determine the touched position on the touchpad 20 by sensing a change in capacitance in both X and Y directions, for example.

In one exemplary embodiment, the touch sensor 21 may be connected to the first sensor 18 and the second senor 19. In another exemplary embodiment, the touchpad 20 may have a wider touch sensor 21 which comprises the first sensor 18 and the second sensor 19 so that the first sensor 18 and the second sensor 19 may be a part of the touch sensor 21. The touch sensor 21 on the touch pad 20 may detect the second body part of the user and the first body part of the user.

Figure 2:
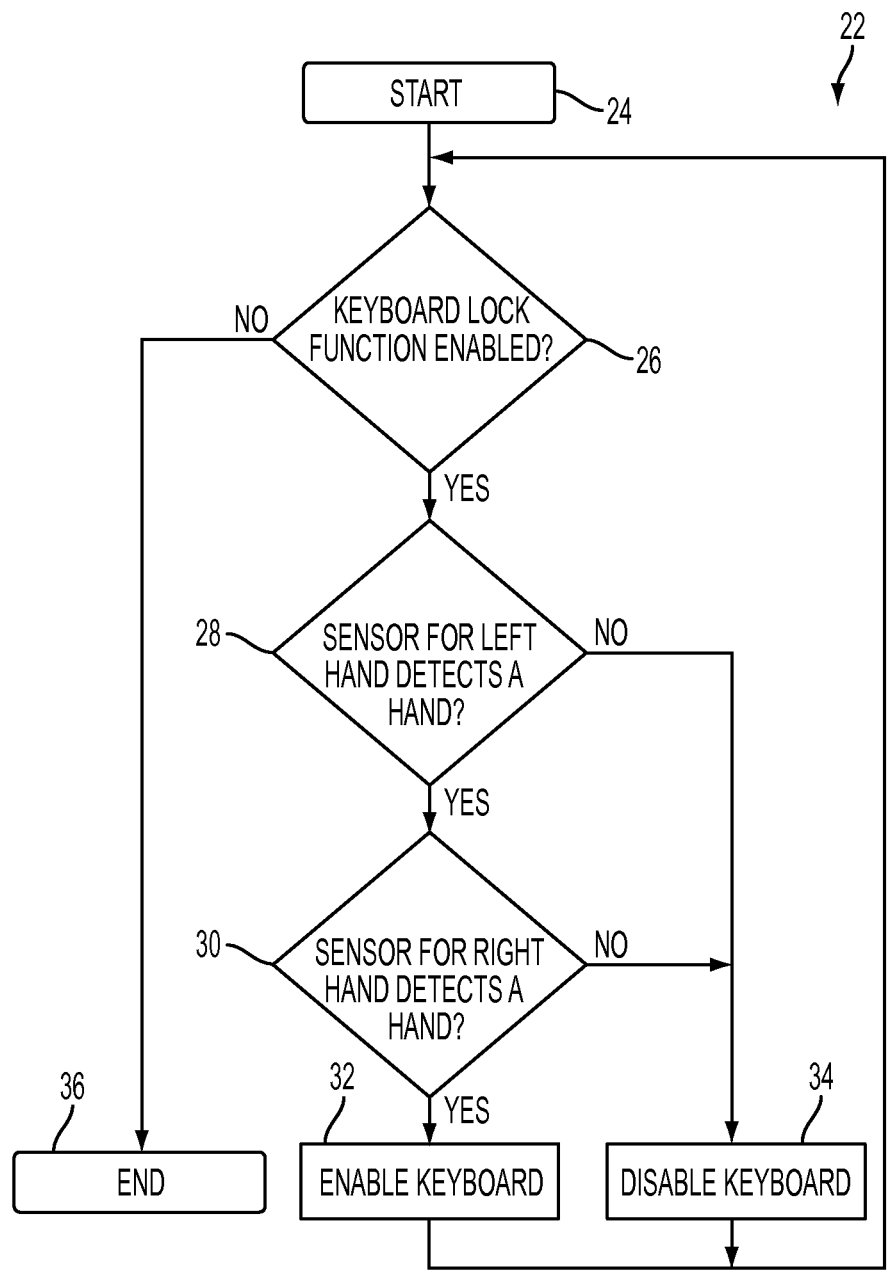
FIG. 2 is a flow chart of a method of enabling a keyboard lock according to an exemplary embodiment.

As shown in FIG. 2, in an exemplary embodiment of a process 22, when the electronic device, such as the notebook PC 10, is started in a step 24, the computer system in the notebook PC 10 may check whether the keyboard lock function is enabled in a step 26. If the keyboard lock function is enabled, the computer system may check whether the first body part, such the left hand of the user, is on or detectable by a first sensor 18 in a step 28.

If the first sensor 18 detects the first body part, the computer system may check whether the second sensor 19 detects a second body part in a step 30. If the first sensor 18 does not detect the first body part, the computer system may disable keyboard in a step 34. Similarly, if the second sensor 19 does not detect the second body part, the computer system may disable the keyboard in the step 34. If the second sensor 19 detects the second body part, the computer system may enable the keyboard in a step 32.

Users may choose to disable keyboard lock function after the notebook PC 10 is started. For example, users may prefer using mouse in one hand and use the keyboard function, such as data input, in the other hand. Users may use touch screen to input in one hand and use the keyboard to input in another hand. In such situations, users may prefer to enable the keyboard even though only one hand may be detected by the sensors. The process 22 may become to an end in a step 36.

The process 22 may further include steps of enabling a first sensor at a first palm rest area to detect a presence of a first body part of the user; enabling a second sensor at a second palm rest area to detect a presence of a second body part of the user; and enabling a keyboard so that the user uses the keyboard to input when the first sensor and the second sensor detect the presence of the first body part and the second body part respectively.

The process 22 may further include a step of disabling the keyboard so that the user cannot use the keyboard to input if neither the first sensor nor the second sensor detects the presence of the first body part or the second body part of the user. When the system disabling the keyboard, the system may enable the touch screen so that the user can still use the touch screen to input data.

The process 22 may include a step of switching between a keyboard disabled state and a keyboard enabled state, wherein in the keyboard disabled state, at least a part of keyboard is disabled, wherein in the keyboard enabled state, an input function of the keyboard is enabled.

It should be understood, of course, that the foregoing relate to exemplary embodiments of the invention and that modifications may be made without departing from the spirit and scope of the invention as set forth in the following claims.

I claim:

1. An input device, comprising:
    a touch screen;
    a keyboard including a plurality of input keys;
    palm rest areas adjacent to the plurality of input keys, wherein the palm rest areas have a first sensor for detecting a presence of a first body part of a user, and a second sensor for detecting a presence of a second body part of the user,
    wherein the keyboard is enabled in the event the first body part and the second body part are detected,
    wherein only a portion of the keyboard is configured to be disabled if either the first sensor or the second sensor does not detect the presence of the first body part or the second body part of the user; and
    a touchpad disposed on the palm rest areas.

2. The input device of claim 1, wherein the first sensor comprises a proximity sensor.

3. The input device of claim 2, wherein the second sensor comprises a proximity sensor.

4. The input device of claim 1, wherein the touchpad has a touch sensor.

5. The input device of claim 4, wherein the touch sensor is connected to the first sensor and the second sensor.

6. A method, comprising:
    enabling a first sensor at a first palm rest area to detect a presence of a first body part of a user;
    enabling a second sensor at a second palm rest area to detect a presence of a second body part of the user;
    enabling a keyboard so that the user uses the keyboard to input when the first sensor and the second sensor detect the presence of the first body part and the second body part of the user respectively; and
    disabling the entire keyboard so that the user cannot use the keyboard to input if either the first sensor or the second sensor does not detect the presence of the first body part or the second body part of the user.

7. The method of claim 6, further comprising permitting touch input on a touch screen while disabling the entire keyboard.

8. The method of claim 6, further comprising using a touch sensor on a touch pad to detect the first body part of the user and the second body part of the user.

9. A non-transitory computer readable medium having computer usable program code embodied therewith, the computer program code comprising:
    computer program code configured to detect a presence of a first body part and a second body part of a user on palm rest areas of an electronic device;

computer program code configured to switch a keyboard between a keyboard disabled state and a keyboard enabled state, wherein in the keyboard disabled state at least a part of the keyboard is disabled and wherein in the keyboard enabled state an input function of the keyboard is enabled;

computer program code configured to enable the keyboard when detecting a presence of the first body part and a second body part of the user on the palm rest areas of the electronic device;

computer program code configured to disable the entire keyboard if both the first body part and the second body part of the user is not detected; and computer program code configured to enable a touch screen when disabling the entire keyboard.

10. The non-transitory computer readable medium of claim 9 further comprising computer program code configured to enable the keyboard when the electronic device is started.

11. The non-transitory computer readable medium of claim 9 further comprising computer program code configured to enable keyboard lock function before detecting a presence of a first body part and a second body part of a user on palm rest areas of the electronic device .

12. The non-transitory computer readable medium of claim 11 further comprising computer program code configured to use a touchpad of the electronic device to detect the presence of the first body part and the second body part of the user on the palm rest areas.

* * * * *